US008005732B2

(12) United States Patent
Khandros et al.

(10) Patent No.: US 8,005,732 B2
(45) Date of Patent: Aug. 23, 2011

(54) SYSTEM FOR REDUCING INFORMATION REQUIRED TO OPEN A NEW ACCOUNT

(75) Inventors: Yelena Khandros, Brooklyn, NY (US);
Lorraine Miranda, Phoenix, AZ (US);
Suzanne K. Berlin, Peoria, AZ (US);
Randy Okerlund, Anthem, AZ (US);
Rhonda Lee Bertucci, Phoenix, AZ (US); Gregory Alan Glenn, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1282 days.

(21) Appl. No.: 10/749,697

(22) Filed: Dec. 31, 2003

(65) Prior Publication Data
US 2005/0144101 A1 Jun. 30, 2005

(51) Int. Cl.
*G06Q 40/00* (2006.01)
(52) U.S. Cl. ......................................................... 705/35
(58) Field of Classification Search ...................... 705/35
See application file for complete search history.

(56) References Cited

U.S. PATENT DOCUMENTS

| 5,790,785 | A  | * | 8/1998  | Klug et al. ...................... 726/11 |
| 5,794,259 | A  | * | 8/1998  | Kikinis .......................... 715/207 |
| 6,088,700 | A  | * | 7/2000  | Larsen et al. .................... 707/10 |
| 6,151,707 | A  | * | 11/2000 | Hecksel et al. ................. 717/178 |
| 6,192,380 | B1 | * | 2/2001  | Light et al. ..................... 715/207 |
| 6,385,594 | B1 | * | 5/2002  | Lebda et al. ..................... 705/38 |
| 6,460,042 | B1 | * | 10/2002 | Hitchcock et al. .................... 1/1 |
| 6,490,601 | B1 | * | 12/2002 | Markus et al. ................. 715/207 |
| 6,496,855 | B1 | * | 12/2002 | Hunt et al. ..................... 709/217 |
| 6,499,042 | B1 | * | 12/2002 | Markus .......................... 715/217 |
| 6,643,624 | B2 | * | 11/2003 | Philippe et al. ................. 705/26 |
| 6,651,217 | B1 | * | 11/2003 | Kennedy et al. ............... 715/224 |
| 6,654,749 | B1 | * | 11/2003 | Nashed ........................... 707/10 |
| 6,662,340 | B2 | * | 12/2003 | Rawat et al. ................... 715/236 |
| 6,711,682 | B1 | * | 3/2004  | Capps ........................... 713/184 |
| 6,775,828 | B2 | * | 8/2004  | Feinleib et al. ................ 717/173 |
| 6,817,521 | B1 | * | 11/2004 | Matada ........................... 235/380 |
| 6,823,327 | B1 | * | 11/2004 | Klug et al. ........................ 707/1 |
| 6,879,965 | B2 | * | 4/2005  | Fung et al. ...................... 705/39 |
| 6,944,677 | B1 | * | 9/2005  | Zhao ............................. 709/244 |
| 6,981,028 | B1 | * | 12/2005 | Rawat et al. ................... 709/217 |
| 7,058,817 | B1 | * | 6/2006  | Ellmore ......................... 713/183 |
| 7,089,224 | B1 | * | 8/2006  | Klug et al. ........................... 1/1 |
| 7,155,739 | B2 | * | 12/2006 | Bari et al. ......................... 726/6 |
| 7,257,581 | B1 | * | 8/2007  | Steele et al. .......................... 1/1 |

(Continued)

OTHER PUBLICATIONS

American Express web site, "Apply Online for an American Express Card," 2001, Wayback machine, pp. 1-2.*

(Continued)

*Primary Examiner* — Jagdish N Patel
*Assistant Examiner* — Kenneth Bartley
(74) *Attorney, Agent, or Firm* — Snell & Wilmer L.L.P.

(57) ABSTRACT

An existing customer of a financial institution may open a new account with their financial institution using an optimized online interface. Initially, the interface presents a standard application for a new account in which an extensive number of fields for personal and financial information must be completed. A link is provided on this long application for use by existing account holders only. Upon selection of the link, an existing account holder is instead presented with a short application in which only the account holder's name, a portion of their social security number, their existing account number, and their account confirmation identifier are required to be entered.

21 Claims, 3 Drawing Sheets

U.S. PATENT DOCUMENTS

| | | | | |
|---|---|---|---|---|
| 7,281,029 | B2 * | 10/2007 | Rawat | 709/204 |
| 7,330,876 | B1 * | 2/2008 | Rawat et al. | 709/205 |
| 7,334,187 | B1 * | 2/2008 | Stanciu et al. | 715/234 |
| 7,376,891 | B2 * | 5/2008 | Hitchock et al. | 715/221 |
| 7,421,395 | B1 * | 9/2008 | Link et al. | 705/1.1 |
| 7,451,392 | B1 * | 11/2008 | Chalecki et al. | 715/234 |
| 7,500,178 | B1 * | 3/2009 | O'Donnell | 715/221 |
| 2001/0027472 | A1 * | 10/2001 | Guan | 709/203 |
| 2001/0037275 | A1 * | 11/2001 | Johnson et al. | 705/36 |
| 2001/0039524 | A1 * | 11/2001 | Harrison et al. | 705/35 |
| 2002/0007343 | A1 * | 1/2002 | Oyama et al. | 705/39 |
| 2002/0013788 | A1 * | 1/2002 | Pennell et al. | 707/507 |
| 2002/0023059 | A1 * | 2/2002 | Bari et al. | 705/76 |
| 2002/0026410 | A1 * | 2/2002 | Woloshin et al. | 705/38 |
| 2002/0062342 | A1 * | 5/2002 | Sidles | 709/203 |
| 2002/0077970 | A1 * | 6/2002 | Lebda et al. | 705/38 |
| 2002/0156846 | A1 * | 10/2002 | Rawat et al. | 709/203 |
| 2002/0165967 | A1 * | 11/2002 | Morgan | 709/227 |
| 2002/0174010 | A1 * | 11/2002 | Rice, III | 705/14 |
| 2003/0149781 | A1 * | 8/2003 | Yared et al. | 709/229 |
| 2003/0233316 | A1 * | 12/2003 | Hu et al. | 705/38 |
| 2004/0093281 | A1 * | 5/2004 | Silverstein et al. | 705/26 |
| 2004/0122770 | A1 * | 6/2004 | Craig et al. | 705/42 |
| 2004/0230536 | A1 * | 11/2004 | Fung et al. | 705/64 |
| 2005/0144101 | A1 * | 6/2005 | Khandros et al. | 705/35 |
| 2005/0256841 | A1 * | 11/2005 | Rawat et al. | 707/1 |
| 2006/0031289 | A1 * | 2/2006 | Experton | 709/204 |
| 2006/0200754 | A1 * | 9/2006 | Kablesh et al. | 715/505 |
| 2007/0244805 | A1 * | 10/2007 | Wiryawan et al. | 705/38 |

OTHER PUBLICATIONS

Creditcards.com, Apr. 14, 2000, Newsletter, p. 2-6.*

Slimed Down for the '90s: AmEx's New Short-Form Take-Ones, Jul. 15, 1991, Credit Card News, v 4, n 5, p. 1-3.*

* cited by examiner

200 ↘      202 ↗

ONLINE NEW ACCOUNT APPLICATION

Already a member? SAVE TIME, CLICK HERE

---

Please provide the following identification information.
Title: __ Mr. __ Mrs. __ Ms. __ Dr.
First Name: _____
Middle Name: _____
Last Name: _____ Suffix: _____
Date of Birth: __/__/____
Social Security No.: _____
Email Address: _____
Home Address: _____
Apt/Suite No.: ____
City: _____ State: _____
Home Phone: _____
Time at Home Address: ___ years and ___ months
Do You: ___ Own? ___ Rent?
Monthly Rent or Mortgage Amount: $_____.00

---

Please tell us about your employment.
Company Name: _____
Street Address: _____ Floor/Suite No.: _____
City: _____ State: _____ Postal Code: _____
Business Phone No.: _____
Time at This Company: ___ years and ___ months.

---

Please provide us with some financial information.
Annual Household Income: $_____
Income Source: _____
Do you have any of the following accounts at with this or another financial institution (check all that apply)?:
    ___ Checking Account. If so, provide account identifier: _____
    ___ Money Market/Savings. If so, please provide account identifer: _____

---

SUBMIT INFORMATION

ONLINE NEW ACCOUNT APPLICATION (SHORT FORM)

---

Please fill in the following existing account information.

First Name: _____ Middle Name: _____
Last Name: _____ Suffix:: _____
Existing Account Number: _____
Account Confirmation No. or CID: _____
Last Four Digits of Your Social Security No.: _____

FIG. 3

SYSTEM FOR REDUCING INFORMATION REQUIRED TO OPEN A NEW ACCOUNT

FIELD OF THE INVENTION

This invention relates generally to automated electrical financial systems, and in particular it relates to the processing of applications for new financial accounts.

BACKGROUND OF THE INVENTION

Currently, a prospective customer and existing customer have similar experiences when applying online for a new financial account, such as a credit card account, with a financial institution. In both cases, when a customer transmits an electronic request to open a new account via a financial institution's publicly accessible web site or the like, such customer is presented with an application for opening a new account in which twenty or more fields of personal identification and financial information must typically be entered. The requested information may include data that is required by existing financial decision-making matrices and similar processes used to evaluate the financial risk and/or credit-worthiness of a customer. However, the time burden imposed on the customer in entering the information may cause some customers to instead forgo the filing of a new account application at all. Each such case then represents a lost opportunity for a financial institution to increase its customer base.

Recognizing this, certain financial institutions allow existing customers to first log into a financial institution's publicly accessible computer system. Having already identified themselves as existing customers in this manner, a shortened application may then be presented to those existing customers that submit a request to open a new account.

Oftentimes though, existing customers may not have logged in or may otherwise wish to forgo entering their user name and password when inquiring about opening a new account. In such cases, the customer may not be presented with the opportunity to use a shorter application form. In addition, any information entered into the standard form is typically lost when the customer attempts instead to login and use the shortened form prior to the completing the standard, longer form. These existing systems do not, therefore, address all the frustrations an existing customer may face when applying online for a new account, which can again lead to undue loss of further customer acquisitions.

Accordingly, there is a need for a system that better accommodates existing customers who apply online to open a new account.

SUMMARY OF THE INVENTION

It is an object of the present disclosure, therefore, to introduce a system for reducing the information required to be entered by an existing customer for opening a new account with a financial institution. In particular, one aspect of the disclosure includes a method for opening an account, in which an initial new account application is transmitted to a customer upon receiving an online request from the customer. The initial new account application may include fields twenty or more fields that require the entry of personal identification and financial information by the customer. In various embodiments, the initial new account application may also have a selectable indicator, such as a check box or a hyperlink, which a customer may select when the customer already has an existing account with a financial institution.

Upon receiving a selection of the indicator from the customer, the financial institution may transmit a second new account application to the customer in place of the initial account application. The second new account application has a fewer number of fields for entering the personal identification and financial information than the first new account application, and in various embodiments, may require only the entry the customer's name, a portion of a government identification number (such as a social security number) of the customer, an account number of an existing account of the customer, and a confirmation number associated with the existing account. In various embodiments, the customer does not need to provide a login/user name identifier or a password to receive the shorter new account application.

Any information received from the customer in the second new account application may be validated with data stored by the financial institution for the existing account. Any additional customer information that may be required, such as that requested in the initial new account application, may also be retrieved from the stored data. In certain embodiments, the customer may be presented with the retrieved information for confirmation and/or updating by the customer. The request for opening the account is then processed using the entered and retrieved customer information.

In further embodiments, a customer may partially or completely fill in the information requested in the initial new account application before selecting the indicator designated for existing customers. Upon later selection of the indicator, the financial institution may transfer any entered information from the initial new account application to the second, shorter new account application where the initial and second new account applications have at least some similar fields. Also, the information entered in the initial account may be verified against the stored information of the existing account to confirm an identity of the customer or to verify and update customer information using the entered information.

BRIEF DESCRIPTION OF THE DRAWINGS

Further aspects of the present disclosure will be more readily appreciated upon review of the detailed description of its various embodiments, described below, when taken in conjunction with the accompanying figures, of which:

FIG. 2 is an exemplary standard new account application that may be presented to a customer according to the process of FIG. 1; and FIG. 3 is an exemplary shortened new account application that may be presented to an existing customer according to the process of FIG. 1.

DETAILED DESCRIPTION OF THE SPECIFIC EMBODIMENTS

Figure 1:
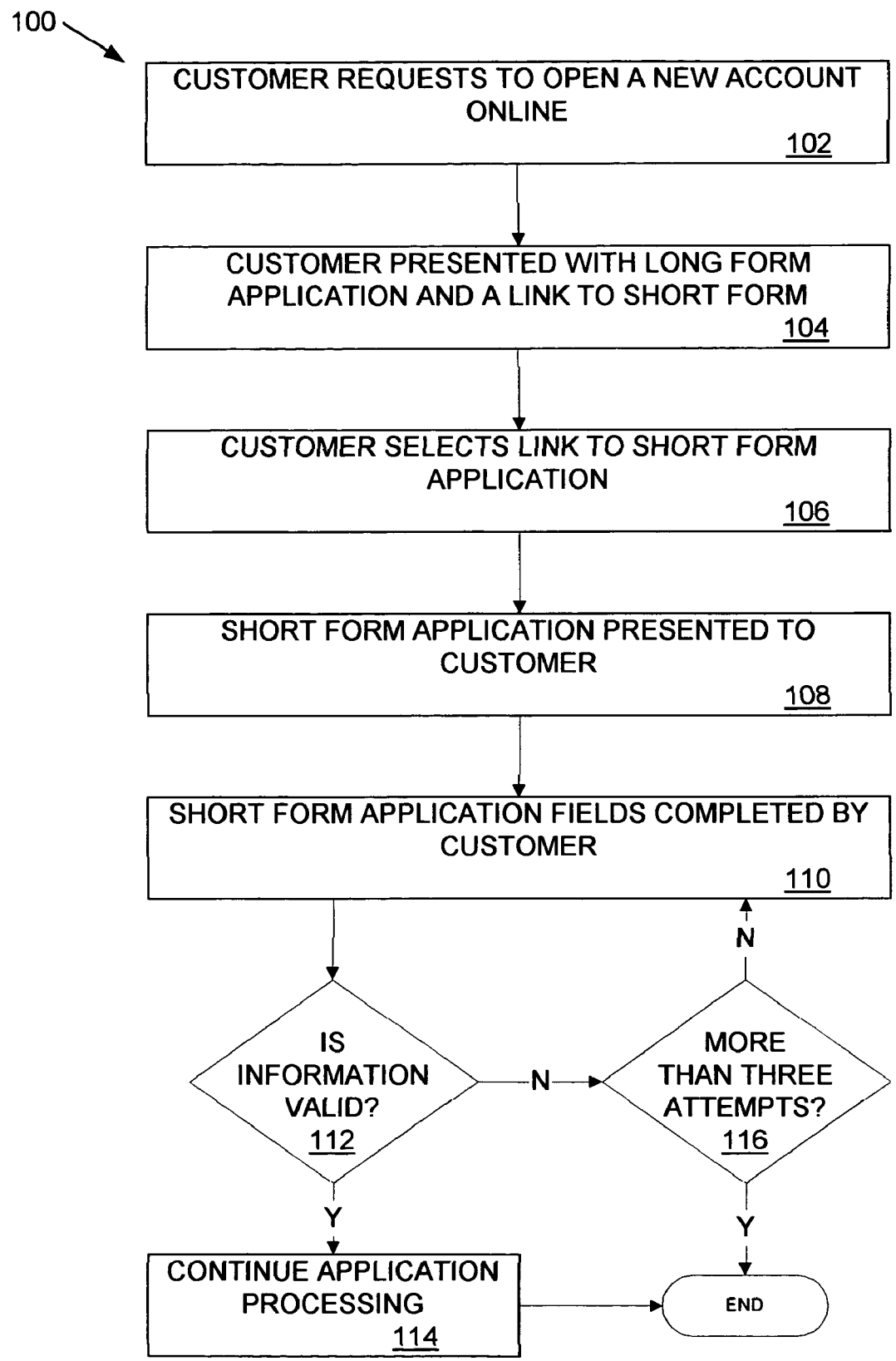
FIG. 1 is a flowchart depicting an exemplary process for opening an account according to the present disclosure.

With reference to FIGS. 1-3, wherein similar components of the present disclosure are referenced in like manner, various embodiments of a system for reducing the information required to open a new account will now be disclosed.

Generally, the system introduced herein provides a standard online application for opening a new account that is publicly available on a web site, or the like, of a financial institution. The standard online application has an extensive number of fields into which personal identification and other financial information must be entered by a user. The standard application, however, now includes a hyperlink or other selectable indicator that the customer may select when the customer already has an account with the financial institution. Upon selection of the indicator, the standard application will be immediately replaced by a second, shorter application that takes less time to complete. The second application may be presented without requiring a user name or login identifier, along with an associated password, as is required in many existing systems. The second application is much shorter than the standard application and may only require entry of the following information: the customer's name; all or a portion of a customer's government identifier (such as the last four digits of a social security number); the account number of an existing account; and an account confirmation number associated with the existing account, such as a standard card identifier (CID) in the case of a credit card account.

This system includes appropriate validation and authentication processes to confirm the information entered by the customer and to retrieve any additional required customer information from the customer's information stored for the identified existing account. The retrieved information may then be provided to known decision/risk processing engines in order to approve or deny the request for a new account. Edit checks are completed on all the information entered by the customer. If the edit checks find incorrect information, the short application will be redisplayed with error messages displayed for any fields with invalid data. The customer may be given a limited number of times to submit valid information.

The object of providing a short application in this manner is to better accommodate existing customers that want to apply online for additional financial accounts or services, thus increasing customer acquisitions without the need for increased solicitation, and without increasing the possibility of fraud by those seeking to obtain a new account.

Turning now to FIG. 1, and with continuing reference to FIGS. 2 and 3, therein is depicted an exemplary process 100 for opening a new account online. The process 100 may be performed, in whole or in part, by an automated system of one or more computers belonging to a financial institution, which includes processors and associated memories for storing and retrieving programmed processing instructions that implement its various steps. The financial institution's computers are operative to store and retrieve personal information and other financial information about customers in one or more enterprise databases. The financial institution computers are further operative to transmit and receive the information described herein with a customer operating a personal computer, or other device having suitable functionality, over a network.

It is readily contemplated that the network may be any type of computer or telecommunications network over which electronic information may be communicated between the financial institution and the customer, including but not limited to: a local area network (LAN), a wide area network, a corporate intranet, a fiber optic network, a wireless network, the Internet, or any combination or interconnection of the same. The network may include known encryption techniques and security protocols for securing transmitted information.

The process 100 begins when a customer transmits an online request to a financial institution to open a new account (step 102). The request may be transmitted by the customer by selecting a hyperlink, or the like, designated for opening a new account online, which may be presented on a publicly-accessible web site maintained by the financial institution.

Upon receiving the request, the financial institution transmits a standard new account application (step 104) for presentation to the customer. One example of a display 200 of the standard new account application is shown in FIG. 2. The standard new account application may include twenty or more fields for entering personal identification and financial information, including employment information and the like. As shown in the display 200, such fields may include one or more fields for entering the customer's full name, fields for entering the customer's address, a field for entering at least a portion of a government identification number (such as a social security number or other tax identifier) of the customer, fields for entering other financial accounts owned by the customer, fields for entering employment and residence information of the customer, and fields for entering an annual income and related information of the customer. The fields presented to the customer in the standard application may include blank text fields, check boxes and/or combo boxes having selectable, predefined responses. The information that is requested is that which may be required by any standard financial risk and/or credit-worthiness decision-making matrices used to determine whether the customer may open a new account.

The standard new account application is also provided with a selectable indicator 202, such as the hyperlink shown in FIG. 2, which is designated for use by existing account holders only. The selectable indicator 202 may instead be a check box or other similar selectable indicator, rather than a hyperlink as shown.

Upon a selection of the indicator by the customer (step 106), the financial institution immediately transmits a shorter new account application for presentation to the user (step 108). Alternatively, when the customer has entered an identification of an existing account with the financial institution in the standard new account application, such information may be used to automatically determine that the customer is an existing customer. In such case, the existing customer may then be presented with the shorter new application form without the customer having to select the indicator 202.

One example of a display 300 of the shorter new account application is shown in FIG. 3. As can be readily seen therein, the shorter application requires less information for completion than the standard new account application provided in step 102. In particular, the shorter new account application may only require the entry of information in the following fields: at least one customer name field, a field for entering at least a portion of a government identification number of the customer, a field for entering an account number of an existing account of the customer, and a field for entering a confirmation number associated with the existing account.

The shorter new account application may include some of the same fields as the standard new account application. For example, both may include one or more customer name fields. In addition, some of the fields in the shorter new account application may or may not be found in the standard new account application. For example, the account confirmation number field of the shorter new account application may not be present in the standard new account application. When a customer has first entered information into the standard new account application before selecting the shorter new account application, any information in the standard application may be transferred to a similar field in the shorter application, rather than being discarded by the system.

Upon completion of the shorter new account application by the customer (step 110), the financial institution then determines whether the information presented in the shorter new account application is valid (step 112). This may be done by comparing the information entered into the fields of the shorter new account application with information stored by the financial institution for the existing account identified in the shorter application. In the case of an existing credit card account, the credit card type, card tenure, and address tenure may also be confirmed. If the information is validated at step 112, the process 100 continues to step 114, described below. Otherwise the process continues to step 116 described later below.

At step 114, the financial institution continues processing the submitted application for a new account. Such processing may include retrieving customer information stored for the existing account which is required for evaluating the risk and credit-worthiness of the customer and submitting any entered and retrieved information to standard decision-making matrices. An approval or a rejection of the new account will then be provided to the customer based on the outcome of the decision-making matrices, after which the process 100 ends.

In the case where the customer has entered at least some information in the longer, standard application prior to receiving the shorter application, any information entered in long application may be compared against any retrieved information for the existing account. If there are discrepancies, the customer may be requested to confirm which information is correct. All or a portion of the retrieved information may also be presented to the customer for verification. Additionally, if there is information required to by the decision-making processes that was not entered by the customer or retrieved from existing account information, a dynamic application page may also be displayed to the customer with the fields to be completed for any such missing information.

If at step 112 above, the information entered by the customer is not validated, the financial institution may give the customer a limited number of opportunities to correct the information. In one contemplated embodiment, the customer may be given only two additional chances to correct the information. Accordingly, at step 116, the financial institution determines whether the customer has made only the permitted number of attempts to enter valid existing account information.

If the customer has not met the threshold limit, the process 100 instead returns to step 110 above where the customer may re-enter the requested information into the shorter application. If, on the other hand, the limitation has been met, the customer may be prevented from completing the shorter application and the process 100 ends. In such case, the customer may be presented with the long application again. Additionally, in certain embodiments, the customer may be prevented from accessing the short application for a predetermined period of time, such as 30 days. Such limitations are intended to deter fraudulent attempts to open an account using the shorter application.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A non-transitory computer-readable medium having stored thereon a plurality of instructions for processing applications, the plurality of instructions, when executed by a processor, are configured to cause the processor to perform operations comprising:
   receiving, by the processor, an incomplete first account application of a customer, including a name of a customer and less than a full government identification number, and selection of a check box indicating that the customer is a pre-existing customer, wherein the received first account application does not include a pre-stored user ID or logon identifier;
   transferring, by the processor, information entered by the customer in fields of the first account application to corresponding fields in a second account application, in response to the selection of a check box indicating that the customer is a pre-existing customer, wherein the transferring of the information from the first account application to the second account application is performed by an automated process;
   verifying, by the processor, the information provided in the first account application against stored information of an existing transaction account to update customer information;
   transmitting, by the processor, the second account application to the customer, wherein the second account application includes a fewer number of the fields for entering personal identification and financial information than the first account application which was previously presented to the customer, wherein the first application and the second application are applications for identical products or services;
   receiving, by the processor, a submitted second account application from the customer; and
   approving or denying, by the processor, the submitted second account application based on the information submitted with the second account application and retrieved stored information associated with the customer.

2. The medium of claim 1, wherein the fields of the first account application comprise at least one of:
   a customer name field, a customer address field, a field for entering financial account information of the customer, a field for entering employment information of the customer, or a field for entering an annual income of the customer.

3. The medium of claim 2, further comprising:
   receiving information for an existing account in the fields of the first account application; and
   validating the information for the existing account.

4. The medium of claim 2, wherein the existing account comprises an existing transaction account and a confirmation code associated with the existing account comprises a transaction card identification (CD) code.

5. The medium of claim 2, wherein the government identification code comprises a social security number of the customer.

6. The medium of claim 1, wherein the second account application comprises at least one of:
   a customer name field, a field for entering at least a portion of a government identification number of the customer, a field for entering an account number of an existing account of the customer, or a field for entering a confirmation number associated with the existing account.

7. The medium of claim 1, wherein the first account application comprises a field that is not in the second account application.

8. The medium of claim 1, wherein the second account application comprises at least one of the fields of the first account application.

9. The medium of claim 1, further comprising:
   receiving information from the customer for each of the fields of the second account application;
   validating the information received from the customer against data stored for an existing account of the customer;
   retrieving information required for the first account application from data stored for the existing account; and processing the second account application based on the retrieved information.

10. The medium of claim 9, wherein the approving or denying the submitted second account application is based on the processing.

11. The medium of claim 9, further comprising:
transmitting the retrieved information to the customer for confirmation.

12. The medium of claim 11, further comprising:
receiving, from the customer, one of a confirmation and a correction for the retrieved information.

13. The medium of claim 1, wherein the first account application comprises a selectable indication that the customer is a holder of an existing account of a financial institution responsible for issuing the first account.

14. The medium of claim 13, further comprising:
receiving a selection of the selectable indicator from the customer.

15. The medium of claim 13, wherein the selectable indication comprises a hyperlink.

16. A method, comprising:
receiving, by a computer-based system for processing applications, an incomplete first account application of a customer, including a name of a customer and less than a full government identification number, and selection of a check box indicating that the customer is a pre-existing customer, wherein the received first account application does not include a pre-stored user ID or logon identifier;
transferring, by the computer-based system, information entered by the customer in fields of the first account application to corresponding fields in a second account application, in response to the selection of a check box indicating that the customer is a pre-existing customer, wherein the transferring of the information from the first account application to the second account application is performed by an automated process;
verifying, by the computer-based system, the information provided in the first account application against stored information of an existing transaction account to update customer information;
transmitting, by the computer-based system, the second account application to the customer, wherein the second account application including a fewer number of the fields for entering personal identification and financial information than the first account application which was previously presented to the customer, wherein the first application and the second application are applications for identical products or services;
receiving, by the computer-based system, a submitted second account application from the customer; and
approving or denying, by the computer-based system, the submitted second account application based on the information submitted with the second account application and retrieved stored information associated with the customer.

17. The method of claim 16, further comprising:
receiving, by the computer based system, information from the customer for each of the fields of the second account application, the information including an identification of the existing transaction account;
validating, by the computer based system, the information received from the customer against data stored for the existing transaction account;
retrieving, by the computer based system, additional information required for the first account application from data stored for the existing transaction account; and
processing, by the computer based system, the second account application based on the retrieved additional information.

18. The method of claim 16, further comprising:
receiving, by the computer based system, information from the customer in the first account application; and
transferring, by the computer based system, the information from the first account application to the second account application for at least one field that is provided in both the first account application and the second account application.

19. A computer based system, comprising:
a computer network communicating with a memory;
the memory communicating with a processor; and
the processor, when executing a computer program for processing applications, is configured to:
receive an incomplete first account application of a customer, including a name of a customer and less than a full government identification number, and selection of a check box indicating that the customer is a pre-existing customer, wherein the received first account application does not include a pre-stored user ID or logon identifier;
transfer information entered by the customer in fields of the first account application to corresponding fields in a second account application, in response to the selection of a check box indicating that the customer is a pre-existing customer, wherein the transferring of the information from the first account application to the second account application is performed by an automated process;
verify, the information provided in the first account application against stored information of an existing transaction account to update customer information;
transmit the second account application to the customer, wherein the second account application including a fewer number of the fields for entering personal identification and financial information than the first account application which was previously presented to the customer, wherein the first application and the second application are applications for identical products or services;
receive a submitted second account application from the customer; and
approve or deny the submitted second account application based on the information submitted with the second account application and retrieved stored information associated with the customer.

20. The system of claim 19, wherein the processor, when executing a computer program for processing applications, is further configured to:
receive information from the customer for each of the fields of the second account application, the information including an identification of the existing transaction account;
validate the information received from the customer against data stored for the existing transaction account;
retrieve additional information required for the first account application from data stored for the existing transaction account; and
process the second account application based on the retrieved additional information.

21. The system of claim 19, wherein the processor, when executing a computer program for processing applications, is further configured to:
receive information from the customer in the first account application; and
transfer the information from the first account application to the second account application for at least one field that is provided in both the first account application and the second account application.

* * * * *